United States Patent
Boulant

(10) Patent No.: US 7,261,279 B2
(45) Date of Patent: Aug. 28, 2007

(54) DEVICE FOR STIRRING AND AERATING A LIQUID IN A TREATMENT VESSEL

(75) Inventor: Alain Boulant, Pornichet (FR)

(73) Assignee: Innova Environnement, Ancenis (FR)

( * ) Notice: Subject to any disclaimer, the term of this patent is extended or adjusted under 35 U.S.C. 154(b) by 2 days.

(21) Appl. No.: 10/475,186

(22) PCT Filed: Apr. 17, 2002

(86) PCT No.: PCT/FR02/01314

§ 371 (c)(1),
(2), (4) Date: Oct. 17, 2003

(87) PCT Pub. No.: WO02/085799

PCT Pub. Date: Oct. 31, 2002

(65) Prior Publication Data

US 2004/0155368 A1    Aug. 12, 2004

(30) Foreign Application Priority Data

Apr. 19, 2001  (FR) .................................. 01 05292

(51) Int. Cl.
*B01F 3/04* (2006.01)
(52) U.S. Cl. .................. 261/29; 261/36.1; 261/91; 261/93; 261/123
(58) Field of Classification Search .................. 261/29, 261/36.1, 49, 58, 67, 84, 91, 93, 123, DIG. 71, 261/DIG. 75

See application file for complete search history.

(56) References Cited

U.S. PATENT DOCUMENTS

| 2,244,902 | A | * | 6/1941 | Stich ...................... 435/255.21 |
| 2,444,902 | A |   | 7/1948 | Torsch |
| 3,643,403 | A | * | 2/1972 | Speece ......................... 95/265 |
| 4,328,175 | A |   | 5/1982 | Roeckel et al. |
| 4,374,030 | A |   | 2/1983 | Franklin, Jr. |
| 4,699,740 | A |   | 10/1987 | Bollenrath |
| 4,900,480 | A |   | 2/1990 | Litz et al. |
| 4,902,302 | A | * | 2/1990 | Reid ........................... 210/628 |

(Continued)

FOREIGN PATENT DOCUMENTS

DE     2408794     9/1975

(Continued)

OTHER PUBLICATIONS

PCT International Search Report dated Sep. 18, 2002.

*Primary Examiner*—Scott Bushey
(74) *Attorney, Agent, or Firm*—Stevens, Davis, Miller & Mosher, LLP

(57) ABSTRACT

A device for stirring and aerating a liquid in a treatment vessel may include a funnel disposed in the upper portion of the vessel to form a passage with the vessel. A duct is connected to the funnel and extends toward the bottom of the vessel and includes an opening in each of its upper and lower portions. A main screw is situated in the duct and has a driving device for driving its rotation. Also, the stirring device may include an aerating device that incorporates air into the liquid by imparting movement to the liquid inside the stirring device so that the liquid cascades over an upper edge and a peripheral structure disposed in the vicinity of the upper edge of the funnel.

18 Claims, 12 Drawing Sheets

U.S. PATENT DOCUMENTS

Figure 1:
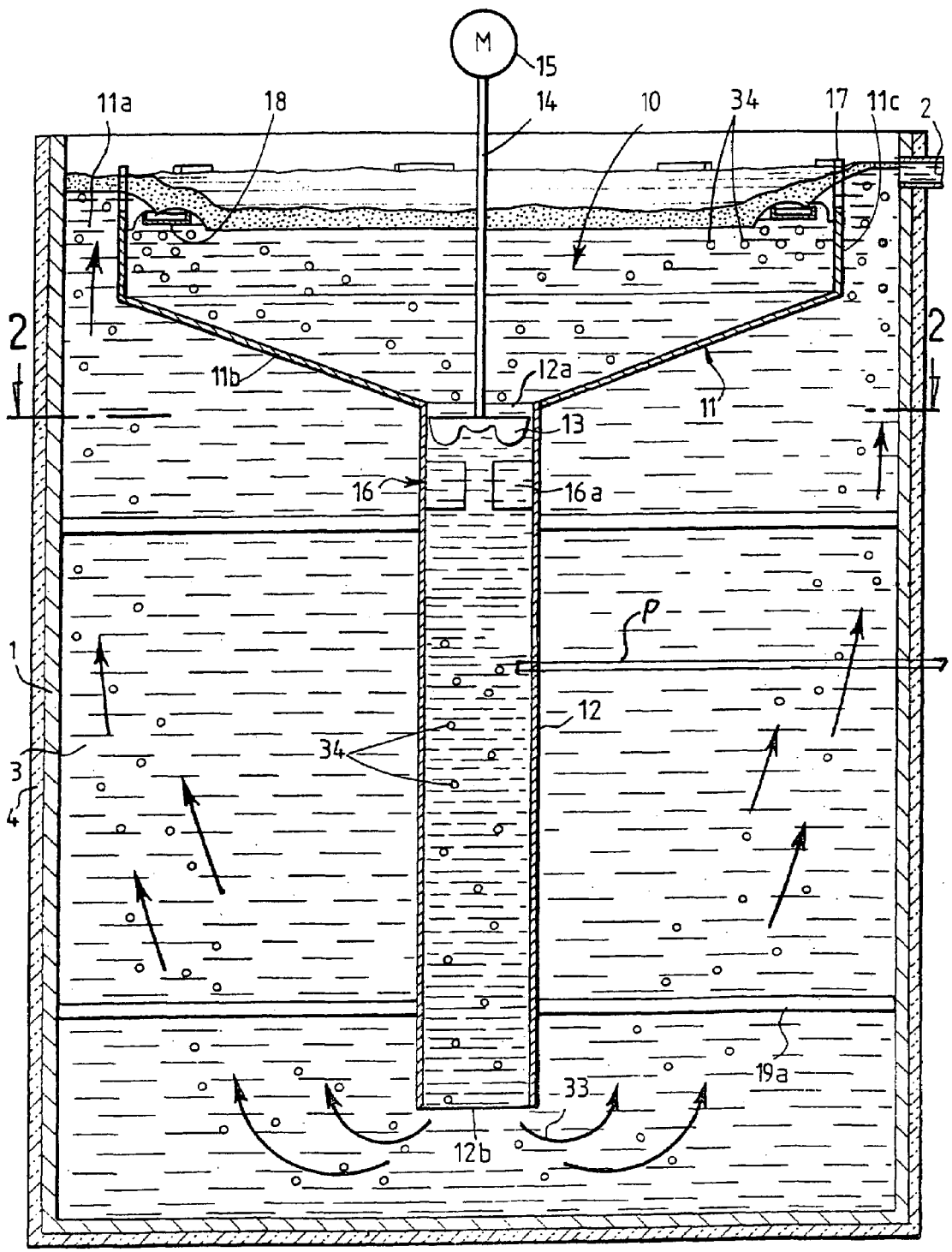

| | | | |
|---|---|---|---|
| 4,919,849 A | | 4/1990 | Litz et al. |
| 5,004,571 A | * | 4/1991 | Litz et al. ............... 261/91 |
| 5,108,662 A | * | 4/1992 | Litz et al. ............... 261/16 |
| 5,110,510 A | * | 5/1992 | Norcross ............... 261/91 |
| 5,451,349 A | * | 9/1995 | Kingsley ............... 261/91 |
| 5,512,217 A | | 4/1996 | Batterham et al. |
| 5,846,498 A | * | 12/1998 | Kingsley ............... 422/227 |
| 5,925,290 A | | 7/1999 | Hills |
| 5,972,661 A | | 10/1999 | Kubera et al. |
| 6,076,812 A | | 6/2000 | Lisi |
| 6,273,402 B1 | * | 8/2001 | Cheng ............... 261/36.1 |
| 6,276,670 B1 | * | 8/2001 | Jacobs ............... 261/91 |
| 6,460,830 B1 | * | 10/2002 | Boulant ............... 261/36.1 |

FOREIGN PATENT DOCUMENTS

| | | |
|---|---|---|
| DE | 3000395 | 7/1981 |
| DE | 3427174 | 5/1982 |
| DE | 9302204 | 8/1993 |
| EP | 0687497 | 12/1995 |
| FR | 2758094 | 7/1998 |
| HU | 180647 | 6/1978 |
| HU | 9701599 | 10/1997 |

* cited by examiner

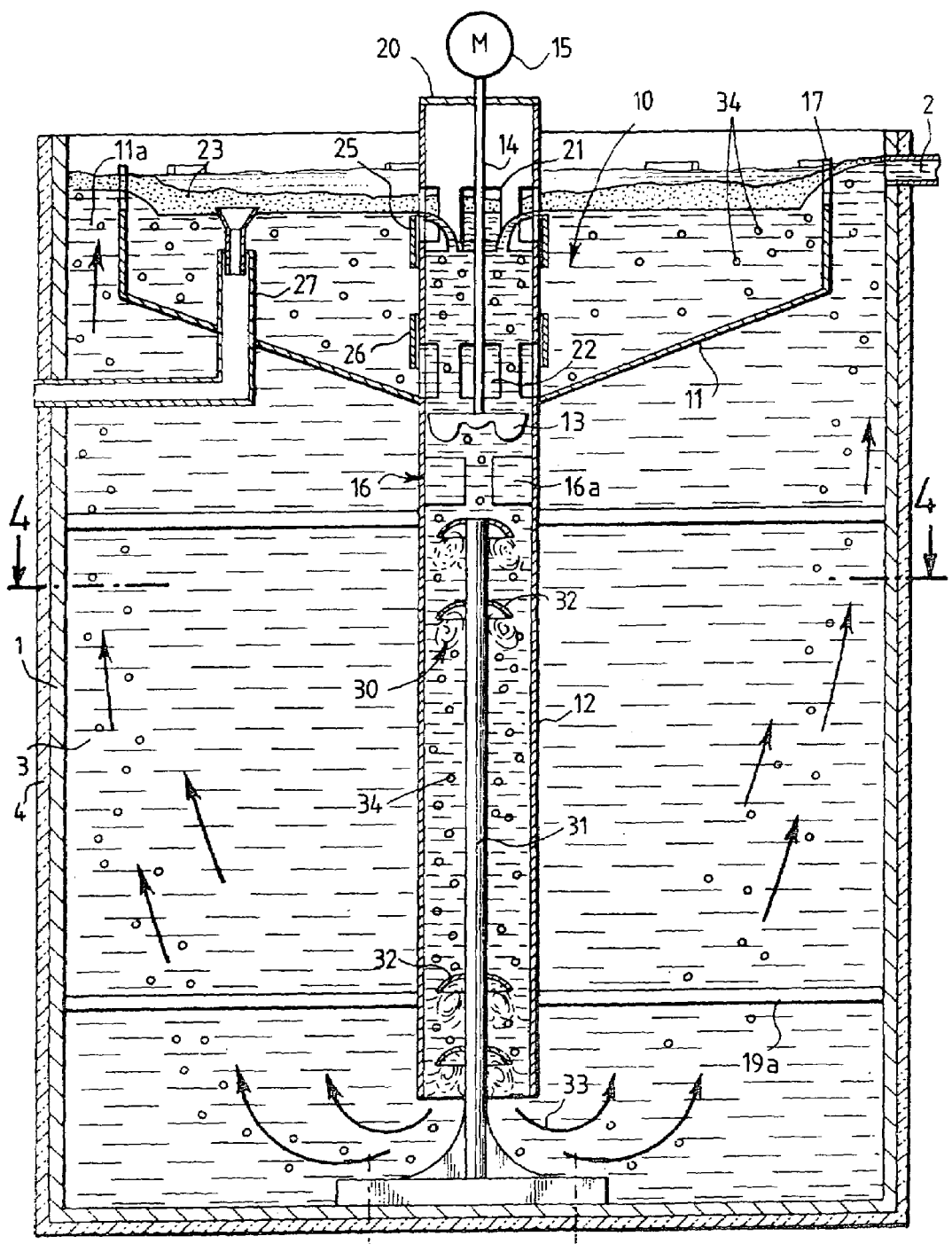
FIG. 3bis

DEVICE FOR STIRRING AND AERATING A LIQUID IN A TREATMENT VESSEL

The present invention relates to a device for stirring and aerating a liquid in a treatment vessel.

International application WO 98 30319 discloses a device for stirring and aerating a liquid in a treatment vessel, comprising:

- at least one funnel adapted to be disposed in the upper portion of said vessel and forming with said vessel a passage,
- at least one duct connected to said funnel and adapted to extend in the direction of the bottom of said vessel, said duct including at least one opening in each of its upper and lower portions,
- at least one main screw situated in said duct,
- means for driving rotation of said screw, and
- means for incorporating air into said liquid.

In the above prior art device, the means for incorporation of air comprise a pipe discharging into the duct under the funnel and means for directing compressed air into said pipe.

Although they encourage the process of aeration of the liquid, in particular with a view to biodegrading it, the above air injection means consume a large amount of energy, which burdens the overall energy balance of the device.

This is a particular problem when it is a question of treating large volumes of liquids heavily charged with organic materials, when the quantity of energy to be expended to inject sufficient air to degrade the liquid may prove prohibitive.

An object of the present invention is to provide economic means that can either be substituted for the air injection means, in particular for standard volumes of normally charged liquids, or added to said injection means, in particular for large volumes of heavily charged liquids.

The above object of the invention is achieved by a device for stirring and aerating a liquid in a treatment vessel, including:

- at least one funnel adapted to be disposed in the upper portion of said vessel and forming with said vessel a passage,
- at least one duct connected to said funnel and adapted to extend in the direction of the bottom of said vessel, said duct including at least one opening in each of its upper and lower portions,
- at least one main screw situated in said duct,
- means for driving rotation of said screw, and
- means for incorporating air into said liquid, characterized in that said air incorporation means comprise, in addition to the upper edge of said funnel, peripheral means disposed in the vicinity of said edge and adapted to incorporate air at atmospheric pressure into said liquid entirely because of the effect of the movement of said liquid.

Thanks to the above features, the movement of the liquid in the vicinity of the upper edge of the funnel is exploited to incorporate air therein, so that said incorporation is achieved by passive means, i.e. without it being necessary to use an additional source of energy.

By substituting the above fixed air incorporation means for the air injection means, or adding them thereto, depending on the volume of liquid to be treated and/or the organic material charge of said liquid, the overall energy balance of the stirring and aeration device can be significantly improved compared to the prior art.

According to other features of the device according to the invention:

- said peripheral means comprise a plurality of projections distributed over the upper edge of said funnel;
- said peripheral means comprise an annular member inside said funnel;
- said annular member takes the form of an annular trough;
- said annular member takes the form of an annular grid;
- said duct extends above the upper edge of said funnel and said air incorporation means comprise at least one window formed in the upper portion of said duct;
- said air incorporation means comprise anti-vortex means disposed inside said duct above said main screw;
- said air incorporation means comprise an accelerator of the liquid inside said duct;
- said air incorporation means comprise means for aerating the surface of said liquid;
- said air incorporation means comprise a vortex pump inside said duct;
- said air incorporation means comprise a single-passage screw inside said duct;
- said air incorporation means comprise a two-passage screw inside said duct;
- said main screw is of the mainly axial flow type;
- said device includes anti-vortex means disposed inside said duct below said main screw;
- said device comprises dynamic stirring means;
- said device comprises static stirring means for creating turbulence disposed inside said duct;
- said device comprises means for aspirating foam formed on the surface of said liquid into the interior of said duct;
- said device comprises means for injecting compressed air into said duct.

The present invention also consists in a liquid treatment vessel equipped with a device according to any one of the preceding claims [sic].

Figure 2:
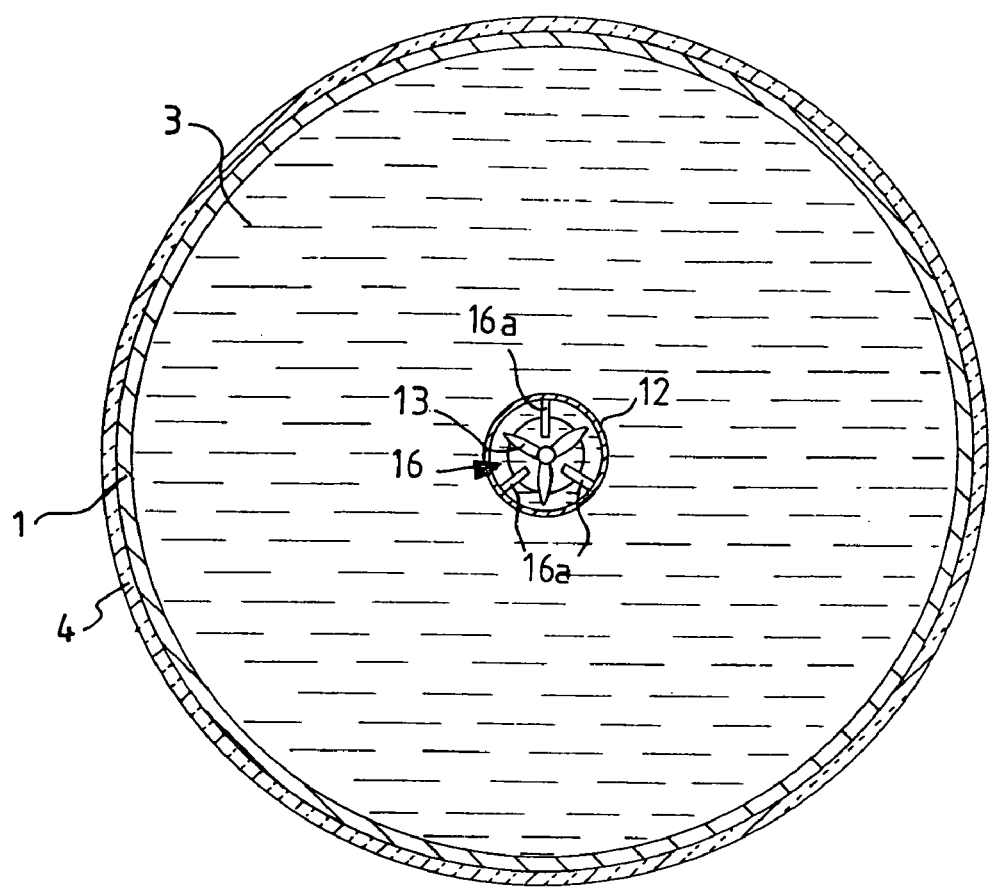
Figure 4:
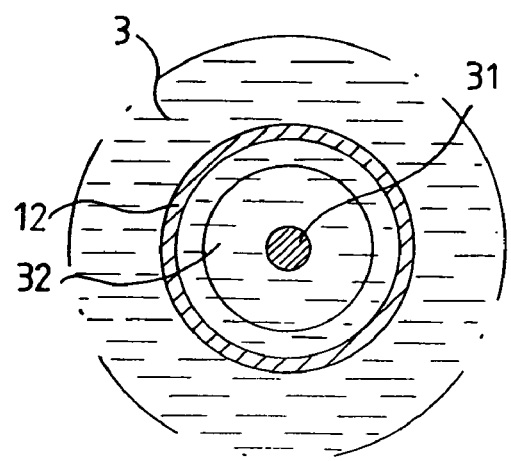
Figure 3:
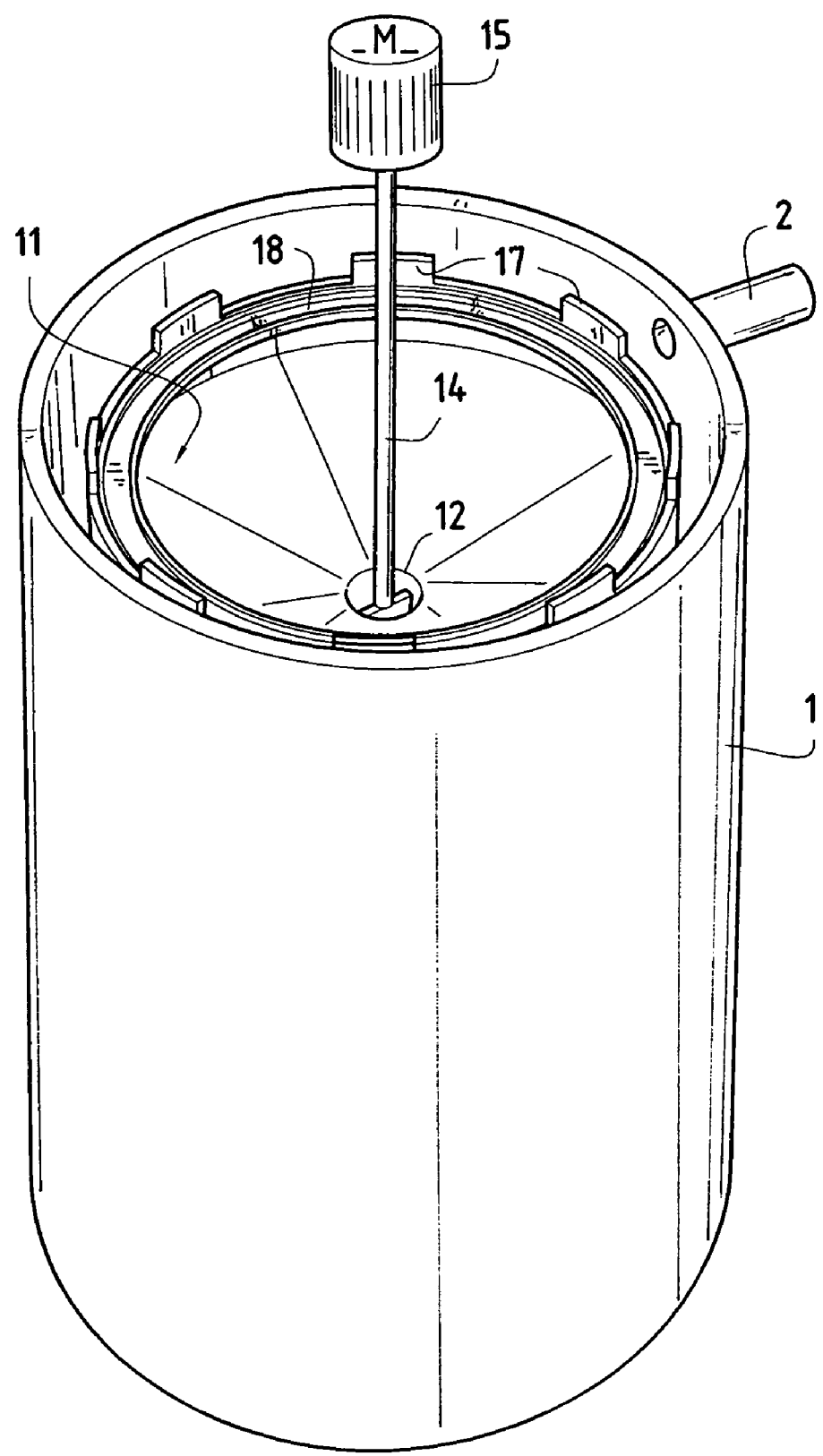
Figure 5:
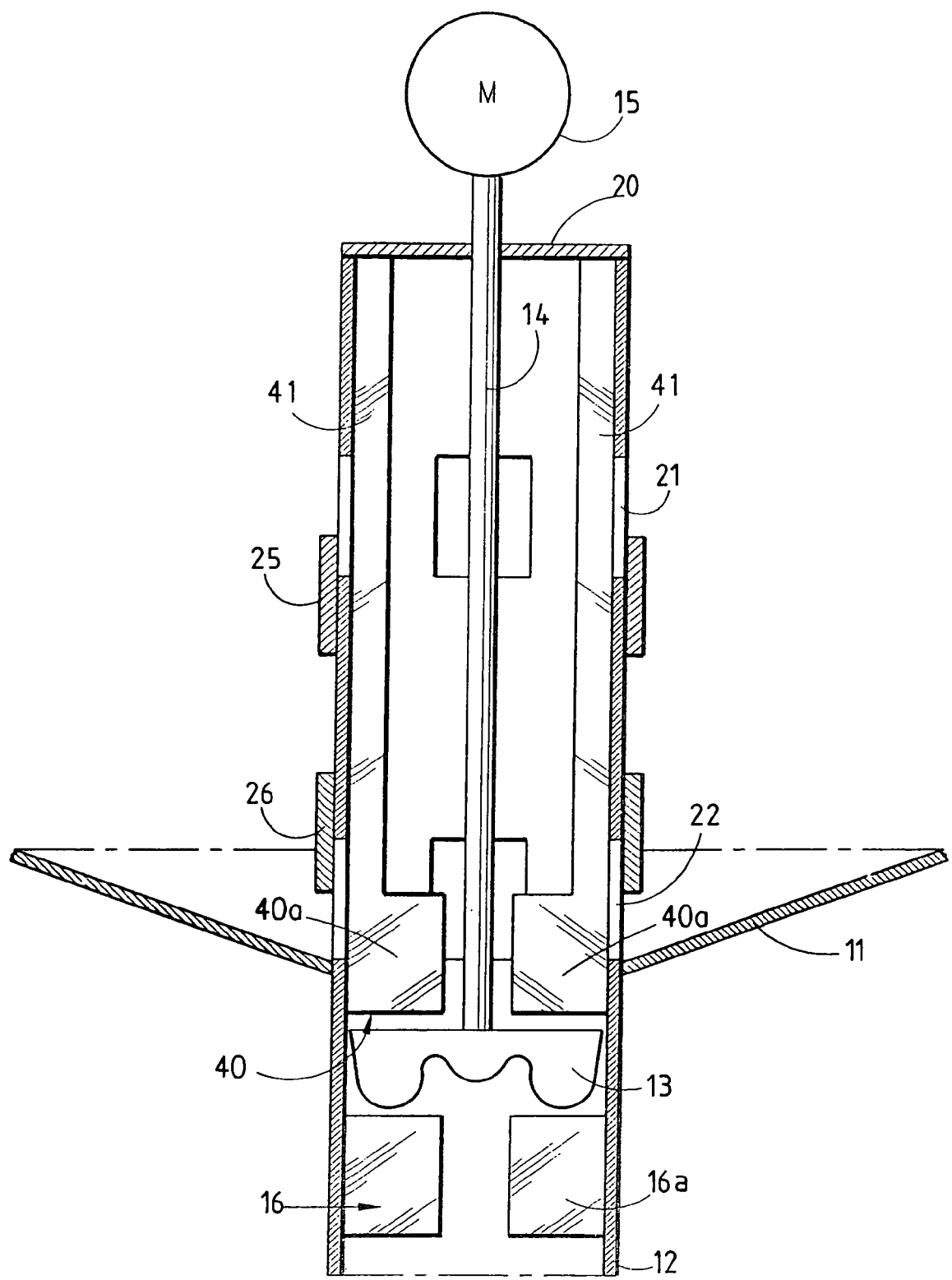
Figure 6:
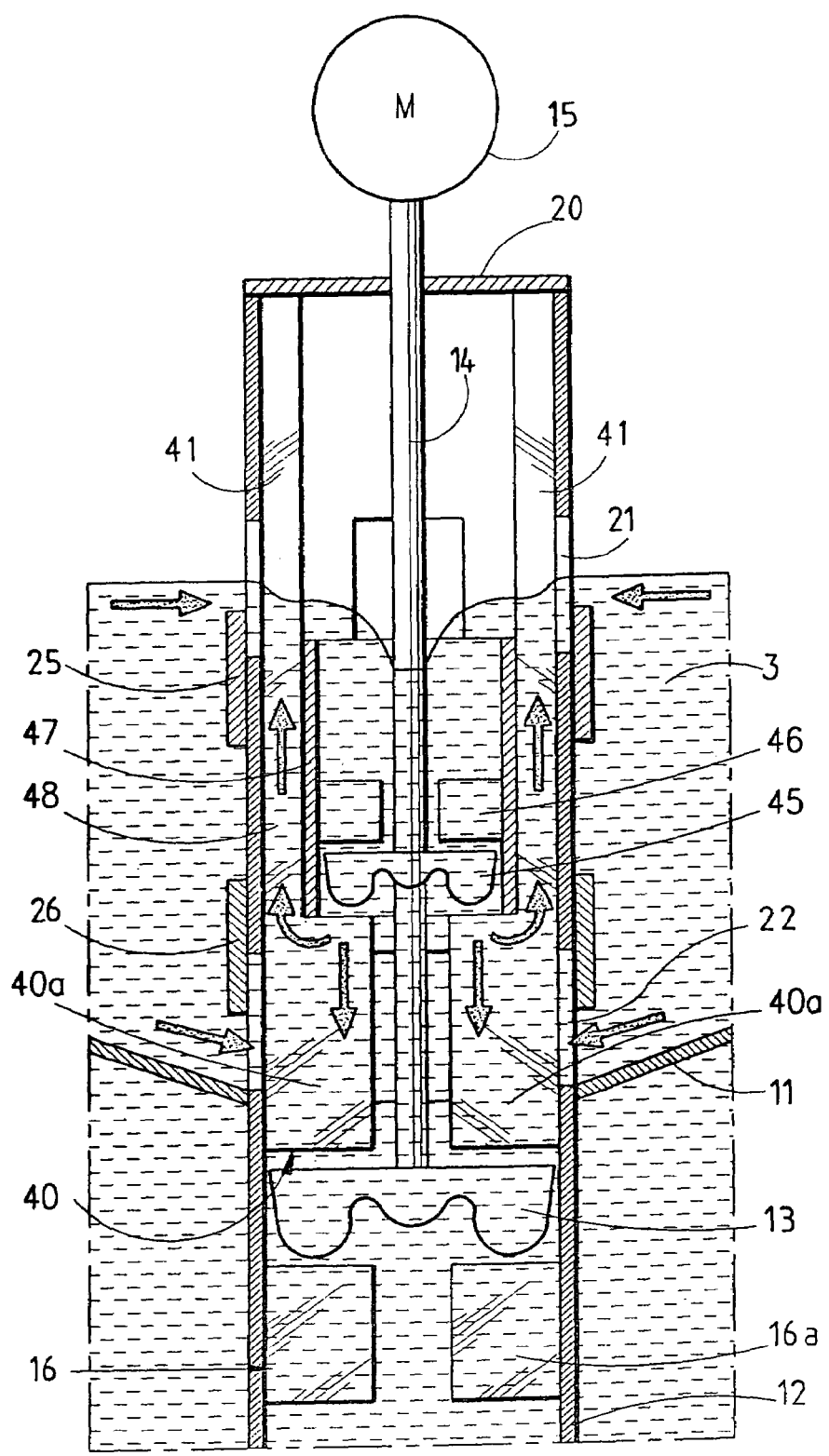
Figure 7:
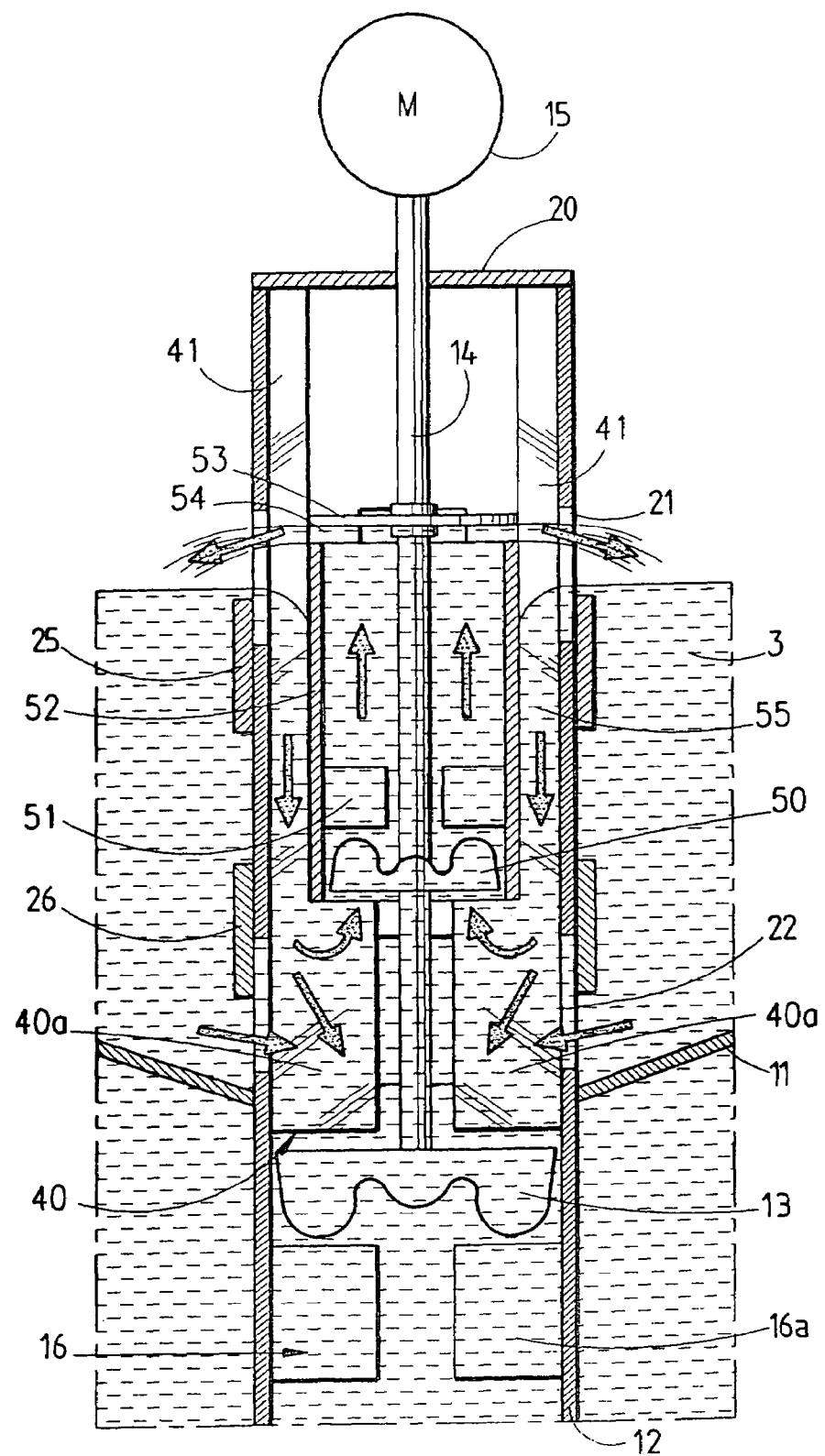
Figure 8:
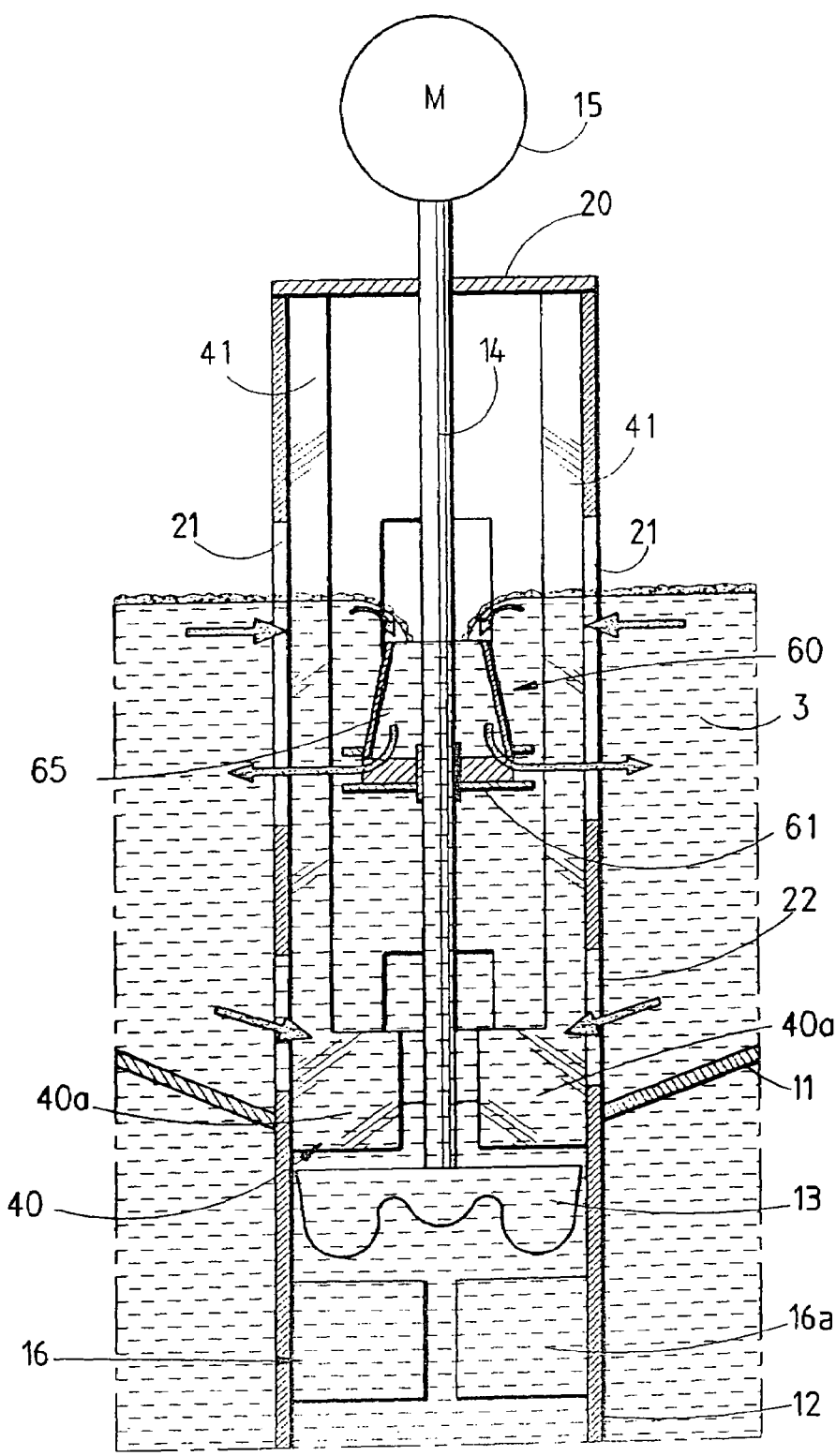
Figure 9:
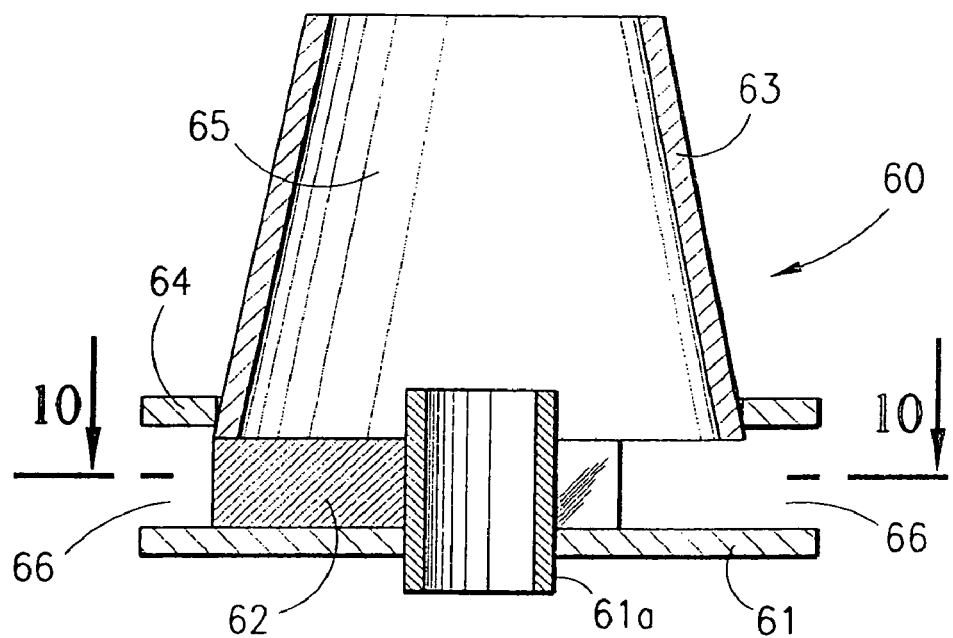
Figure 10:
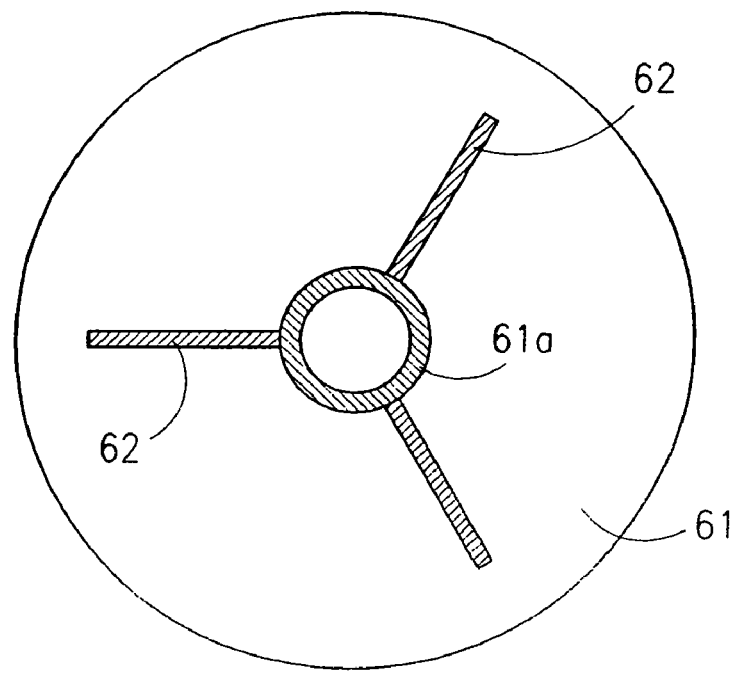
Figure 11:
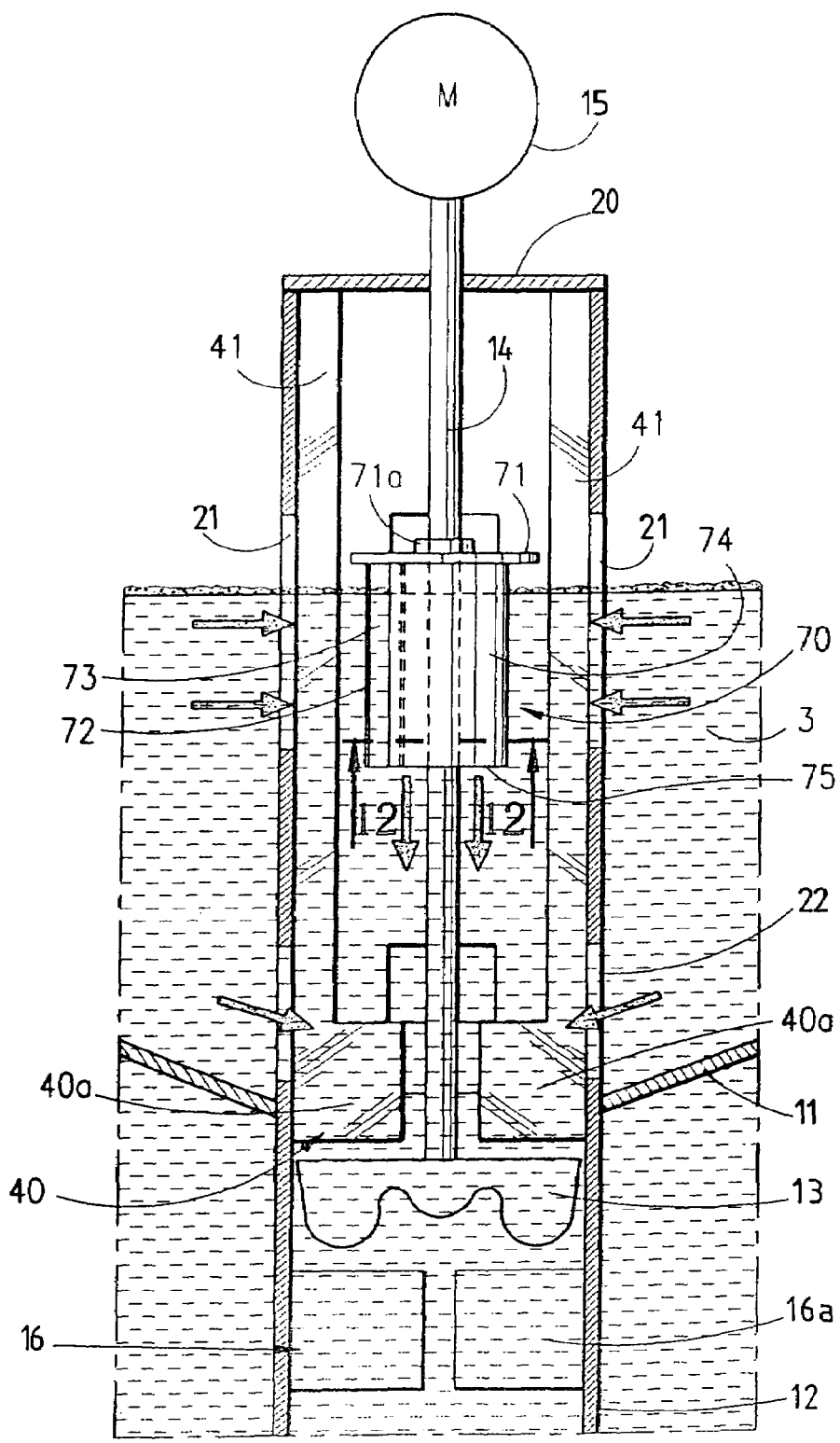
Figure 12:
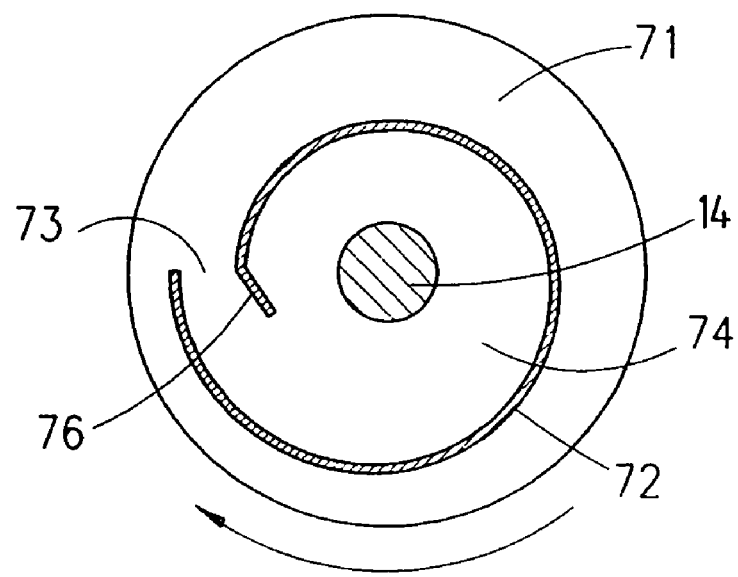
Figure 14:
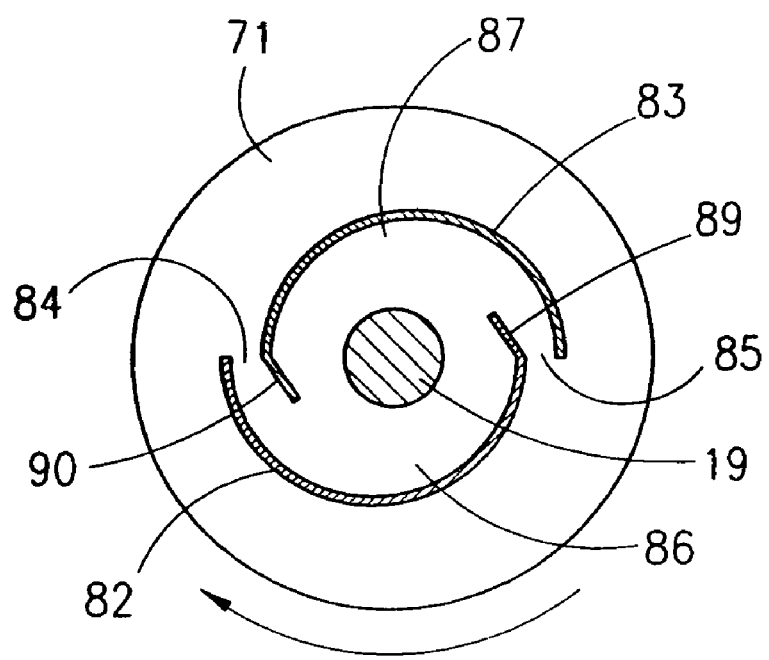
Figure 13:
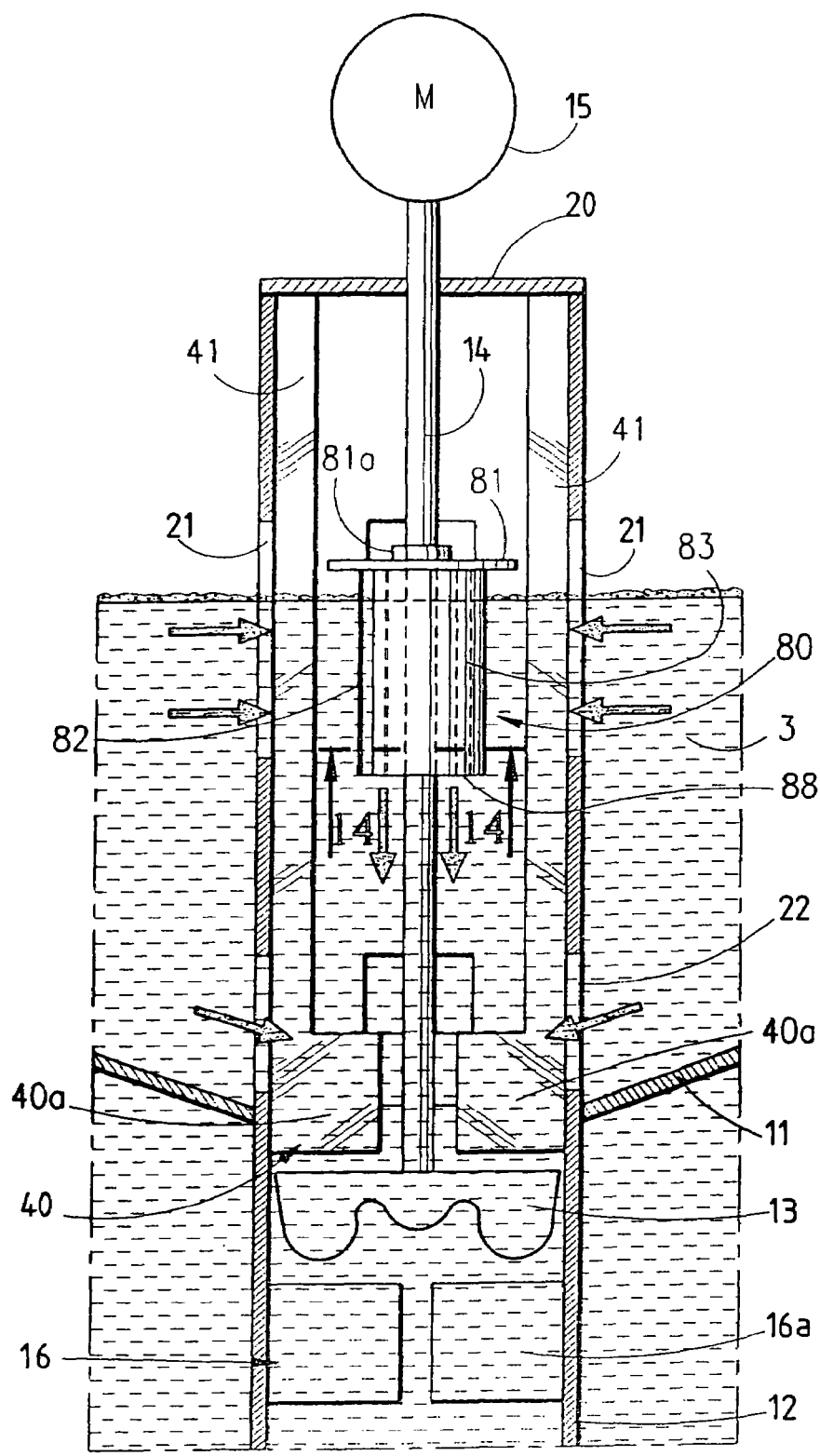

Other features and advantages of the present invention will become apparent in the light of the following description and from an examination of the appended drawings, in which:

FIG. 1 is a diagrammatic view in section of a liquid treatment vessel equipped with a first embodiment of a device according to the invention, FIG. 2 is a view in section taken along the line 2-2 in FIG. 1, FIG. 3 is a perspective view of the FIG. 1 treatment vessel, FIG. 3*bis* is a diagrammatic view in section of a liquid treatment vessel equipped with a second embodiment of the device according to the invention, FIG. 4 is a view in section taken along the line 4-4 in FIG. 3, FIG. 5 is a partial diagrammatic view in section of a third embodiment of the device according to the invention, FIG. 6 is a diagrammatic view in section of a liquid accelerator associated with the third embodiment of the device according to the invention, FIG. 7 is a diagrammatic view in section of means associated with the FIG. 6 accelerator for aerating the surface of the liquid, FIG. 8 is a diagrammatic partial view in section of a fourth embodiment of a device according to the invention, FIG. 9 is a diagrammatic view to a larger scale of the vortex pump of the fourth embodiment of the device according to the invention, FIG. 10 is a view in section taken along the line 10-10 in FIG. 9, FIG. 11 is a diagrammatic partial view in section of a fifth embodiment of the device according to the invention, FIG. 12 is a view in section taken along the line 12-12 in FIG. 11, FIG. 13 is a diagrammatic partial view in section of a sixth embodiment of the device according to the invention, and FIG. 14 is a view in section taken along the line 14-14 in FIG. 13.

In the above figures, identical reference numbers designate identical or analogous parts or sets of parts.

FIG. 1 shows a vessel 1 provided at the top with an inlet orifice 2 for a liquid 3 to be treated, such as greasy effluent extracted from urban waste water effluent, for example.

The treatment vessel 1 can be covered with insulation 4 on its external face and include a device 10 in accordance with the invention for stirring and aerating the liquid.

The device 10 is disposed inside the vessel 1 and comprises a funnel 11 that widens in the upward direction, and is placed in the upper portion of the vessel 1, and whose upper edge forms with the wall of the vessel 1 a free space 11a for the passage of the liquid 3.

The device further includes a duct 12 connected to the funnel and extending in the direction of the bottom of the vessel 1, the duct having an opening 12a at the top communicating with the bottom of the funnel 11 and an opening 12b at the bottom discharging in the vicinity of the bottom of the vessel 1.

The device 10 is further provided with means for aspirating the liquid into the interior of the duct 12, comprising a main screw 13 disposed under the bottom of the funnel 11 and fixed to a vertical shaft 14 adapted to be driven in rotation by a gear motor 15.

The screw 13 is preferably of a type known in the art with mainly axial flow, i.e. of the type adapted to generate a field of velocities only slightly inclined to the axis of the screw.

This type of screw is used in particular in applications in which it is essential, for reasons of safety, to enclose the screw: because this type of screw generates a mainly axial flow, it limits the losses of energy at the enclosing walls, and thus optimizes efficiency.

This type of screw is found in tugs, for example, where it is essential to protect the screw to prevent it becoming entangled in the cables of ships to be towed.

An anti-vortex member 16 is preferably disposed inside the sleeve 12 below the screw 13 to prevent rotation of the liquid 3 in the duct 12.

As shown in FIG. 2, the anti-vortex member 16 comprises three vertical plates 16a inside said duct 12 and spaced by 120°.

The device according to the invention comprises means disposed in the vicinity of the upper edge of the funnel 11 and adapted to incorporate air at atmospheric pressure into the liquid 3 due only to the effect of the movement of the liquid.

As shown in FIGS. 1, 3 and 3bis, the peripheral incorporation means can comprise a plurality of projections 17 disposed on the upper edge of the funnel 11 and possibly taking the form of regularly spaced teeth.

As shown in FIGS. 1 and 3, the peripheral incorporation means can comprise an annular member 18 inside the funnel 11, in the vicinity of its upper end.

This member can take the form of an annular trough, for example, as shown here, or an annular metal grid.

An optional pipe P (shown in FIG. 1) for injecting compressed air into the duct 12 can be provided, as disclosed in the application WO 98 30319.

The device 10 can be connected to the interior of the vessel 1 by lugs 19a with passages for the liquid 3 between them.

Refer now to FIG. 3bis, which shows a second embodiment of the invention.

Only those features that distinguish it from the previous embodiment are described hereinafter.

The duct 12 extends higher than the upper edge of the funnel 11 and its upper end is closed by a plate 20 supporting the gear motor 15.

The duct 12 includes a first series of windows 21 uniformly distributed around its perimeter and situated at the level of the liquid 3 inside the funnel 11.

The duct 12 further includes a second series of windows 22 uniformly distributed around the perimeter of the duct 12 and situated higher than the bottom of the funnel 11.

The device 10 is provided with means for adjusting the flowrate of the liquid 3 and foam 23 aspirated by the main screw 13 into the interior of the duct 12 via the windows 21 and 22.

The aforementioned adjustment means comprise, firstly, a first sleeve 25 disposed around the duct 12 at the level of the first series of windows 21 and, secondly, a second sleeve 26 disposed around said duct 12 at the level of the second series of windows 22.

The position of each of the sleeves 25 and 26 relative to the respective windows 21 and 22 can be adjusted vertically by appropriate clamping means, not shown.

In this second embodiment, the device 10 also comprises means for regulating the level of the liquid 3 in the funnel 11.

Those means can comprise an overflow pipe 27 disposed inside the funnel 11 and whose position can be adjusted vertically.

In this second embodiment, the device 10 also comprises static means 30 disposed inside the duct 12 and below the anti-vortex member 16 for stirring the liquid 3 by creating turbulence.

As shown in FIGS. 3bis and 4, the static means 30 comprise, firstly, a vertical tube 31 disposed inside the duct 12 and extending from the bottom of the vessel 1 to the bottom of the anti-vortex member 16 and, secondly, superposed obstacles 32 disposed inside the duct 12 and fixed to the tube 31.

The tube 31 is fixed to the bottom of the vessel 1 by appropriate means.

The obstacles 32 and the internal wall of the duct 12 form passages for the circulation of the liquid.

As shown in FIG. 3bis, the obstacles 32 are preferably distributed over the tube 31, firstly, below the anti-vortex member 16 and, secondly, in the lower portion of the duct 12.

For example, the upper portion of the tube 31, below the anti-vortex member 16, includes two superposed obstacles 32 and the lower portion of the duct 12 also includes two superposed obstacles 32.

In a variant that is not shown, the obstacles 32 can be readily distributed over all of the portion of the tube 31 disposed in the duct 12.

As shown in FIG. 3bis, the obstacles 32 are preferably cups whose concave side is directed toward the bottom of the vessel 1.

In a variant that is not shown, the obstacles 32 can take the form of disks.

In another variant that is not shown, the static stirring means for creating turbulence can take the form of obstacles disposed on the internal wall of the duct 12 and forming an axial passage for the flow of the liquid 3.

The obstacles can readily be distributed over the whole of the portion of the duct 12 situated below the anti-vortex member 16 or grouped together, firstly, below the anti-vortex member 16 and, secondly, in the lower portion of the duct 12.

In this case also, the obstacles can take the form of disks or cups whose concave side is directed toward the bottom of the vessel 1.

In the second embodiment, the device 10 does not include any annular member 18 (see FIG. 3).

However, it must be understood that the invention also includes a device having the above kind of annular member in addition to the features of the second embodiment.

More generally, it must be understood that the invention includes any device combining some or all of the features of the first and second embodiments described hereinabove, provided that the device comprises peripheral air incorporation means in the vicinity of the upper edge of the funnel 11.

Thus the invention also includes a device comprising windows 21, 22 but no static stirring means 30 for creating turbulence, for example.

The invention also includes a device having dynamic means for stirring the liquid situated in the duct, conforming for example to the teaching of patent application EP 0 687 497.

The dynamic stirring means can comprise a "long shaft", i.e. a shaft extending under the main screw 13 inside the duct 12 and provided with means for stirring the liquid situated inside the duct 12.

The device that has just been described operates in the following manner.

The liquid 3 to be treated is discharged into the vessel 1 via the orifice 2 up to a level situated above the upper edge of the funnel 11 (see FIGS. 1 and 3*bis*).

The liquid 3 is also discharged into the interior of the funnel 11.

The gear motor 15 drives rotation of the shaft 14 which in turn drives rotation of the main screw 13.

The rotation of the main screw 13 causes aspiration of the liquid 3 into the duct 12 with the result that the liquid 3 flows continuously downward in the duct 12, enters the space 33 between the lower end of the duct 12 and the bottom of the vessel 1, flows upward between the duct 12 and the internal wall of the vessel 1, and so on.

The anti-vortex member 16 prevents rotation of the liquid in the duct 12 below the screw 13.

Because of the suction caused by the screw 13, the level of the liquid 3 inside the funnel 11 is below the level of the liquid inside the vessel 1.

This results in the liquid 3 cascading over the whole of the periphery of the funnel 11.

The presence of the peripheral air incorporation means, such as the projections 17 and/or the annular member 18, completes the incorporation of air caused only by the presence of the upper edge of the funnel 11, which causes the liquid 3 to drop into the funnel 11.

The projections 17 form obstacles separating the flow of the liquid 3 into a plurality of streams which naturally trap air on joining together again.

The annular member 18 forms an obstacle for creating additional cascades contributing to the incorporation of air.

In the second embodiment (see FIG. 3*bis*), the suction caused by the screw 13 also has the effect of creating an additional cascade inside the duct 12, which contributes to the incorporation of air into the liquid 3.

It will be noted that the overflow pipe 27 adjusts the level of the liquid 3 inside the funnel 11 so that it is substantially halfway up the windows 21.

It will also be noted that the windows 21 ensure that the foam 23 on the surface of the liquid 3 is drawn into the duct 12, thereby preventing the foam from flying off and polluting the environment.

It will further be noted that the flowrate of the liquid 3 can be adjusted by moving the sleeves 25 and 26 relative to the windows 21 and 22.

When the liquid 3 flows into the duct 12, turbulence is created below each of the obstacles 32, dividing the bubbles of air 34 into microbubbles, which encourages the biodegradation process, and thus improves the efficiency of the device according to the invention.

In each of the embodiments described hereinabove, the gas bubbles between the internal wall of the vessel 1 and the duct 12 accelerate upward movement of the liquid, encouraging the circulation of the liquid inside the vessel 1, which improves efficiency.

Accordingly, the liquid to be treated passes through the duct 12 several times and therefore receives several oxygenation treatments.

On each passage, because of the projections 17 and/or the annular member 18, air at atmospheric pressure is incorporated into the liquid 3 exclusively by the effect of the movement of the liquid, this air accounting for the biodegradation of the liquid 3.

The optional use of a main screw 20 of the type described hereinabove, i.e. for which most of the flow is axial, increases the height the liquid 3 falls at the upper edge of the funnel 11, and thus encourages the action of the projections 17 and/or the annular member 18 and improves the efficiency of the device.

It goes without saying that combining the projections 17 with the annular member 18 improves the efficiency of the device.

Of course, the optional injection of compressed air into the interior of the duct 12 also increases the efficiency of the device.

The rotation speed of the main screw 20 is chosen to match the operating conditions of the device according to the invention to the nature of the liquid to be treated.

As is now clear, the movement of the liquid 3 in the vicinity of the upper edge of the funnel 11 is exploited to incorporate additional air therein by passive means, i.e. without it being necessary to use an additional source of energy.

By substituting the air incorporation means 17, 18 for the air injection means, or by adding them to the latter, depending on the volume of liquid to be treated and/or the organic materials charge of that liquid, the overall energy balance of the stirring and aeration device can be significantly improved compared to the prior art.

Other embodiments comprising mobile means for adding to the effect of incorporation of air obtained by using the peripheral means 17, 18 are briefly described next.

In the third embodiment, shown in FIG. 5, the device comprises a second anti-vortex member 40 disposed inside the duct 12 and above the main screw 13.

This second anti-vortex member 40 takes the form of at least two vertical plates 40*a* each extended upward by a reinforcing rib 41 extending as far as the upper end of said duct 12.

The second anti-vortex member 40 preferably takes the form of four vertical plates 40a uniformly distributed inside the duct 12 and each extended upward by a reinforcing rib 41.

The second anti-vortex member 40 creates a friction force on the liquid 3 which causes agitation to facilitate the incorporation of air into the liquid 3.

In a variant shown in FIG. 6, the device comprises a liquid accelerator inside the duct 12.

This liquid accelerator takes the form of a secondary screw 45 disposed above the second anti-vortex member 40 and constrained to rotate with the shaft 14.

The pitch of the secondary screw 45 is the same as the pitch of the main screw 13.

Moreover, the liquid accelerator further comprises an anti-vortex member 46 disposed above the secondary screw 45 and inside a cylindrical chimney 47.

The chimney 47 is fixed to the internal edge of the reinforcing ribs 41 to form passages 48 for the liquid between the reinforcing ribs 41 and in conjunction with the duct 12.

The secondary screw 45, the anti-vortex member 46, and the chimney 47 are situated between the two series of windows 21 and 22 which, in this variant, are provided with adjustment sleeves 25, 26.

The rotation of the main screw 13 aspirates the liquid 3 into the duct 12 via the windows 21 and 22 and the liquid 3 therefore flows continuously downward in the duct 12.

Moreover, the rotation of the secondary screw 45 accelerates the aspiration of the liquid 3 into the duct 12 via the windows 21 and 22 and some of the liquid rises up again through the passages 48 between the duct 12 and the chimney 47, which further accentuates this phenomenon of acceleration of the liquid inside said duct 12.

The anti-vortex member 46 prevents rotation of the liquid in the chimney 47.

The acceleration and the aspiration of the liquid have the effect of subjecting it to violent agitation, encouraging the incorporation of air into the liquid.

This variant is suitable in particular for products that are especially foamy.

Foam floating on the surface of the liquid 3 is aspirated into said chimney 47 because of the acceleration of the aspiration of the liquid 3 into the interior of the chimney 47 and the recirculation of some of the liquid in the passages 48.

In a variant shown in FIG. 7, the device includes means for aerating the surface of the liquid 3 inside the vessel 1.

As shown in this figure, the means for aerating the surface of the liquid 3 take the form of a secondary screw 50 disposed above the second anti-vortex member 40 and constrained to rotate with the shaft 14.

The pitch of the secondary screw 50 is the opposite to the pitch of the main screw 13.

The means for aerating the surface of the liquid 3 further comprise an anti-vortex member 51 disposed above the secondary screw 50 and inside a cylindrical chimney 52.

The chimney 52 is fixed to the internal edges of the reinforcing ribs 41 to form passages 55 for the liquid 3 in conjunction with the duct 12 and said reinforcing ribs 41.

The secondary screw 50 and the anti-vortex member 51 are situated between the two series of windows 21 and 22 and the chimney 52 extends substantially from the middle of the first series of windows 21 to the upper edge of the second series of windows 22.

A cover 53 is mounted on the shaft 14 above the upper edge of the chimney 52.

The vertical position of the cover 53 is adjustable to form an adjustable passage 54 in conjunction with the upper edge of the chimney 52.

The rotation of the main screw 13 causes aspiration of the liquid 3 through the windows 21 and 22 as a result of which the liquid 3 flows upward in the duct 12.

Accordingly, some of the liquid 3 is aspirated into the duct 12 through the windows 22 and some of the liquid 3 is aspirated through the windows 21 and flows downward in the passages 55 formed between the chimney 52 and the duct 12.

Moreover, because the pitch of the secondary screw 50 is the opposite of the pitch of the main screw 13, some of the liquid is aspirated upward into the chimney 52 and is sprayed into the air at the surface of the liquid 3 inside the funnel 11 on passing through the passage 54.

Spraying some of the liquid therefore incorporates air into the liquid and, moreover, reduces the formation of foam on the surface of the liquid.

The anti-vortex member 51 prevents rotation of the liquid in the chimney 52 above the secondary screw 50.

In this variant the flowrate of the liquid 3 in the duct 12 can be adjusted by moving the sleeves 25 and 26 relative to the windows 21 and 22.

In a fourth embodiment shown in FIGS. 8 to 10, the device according to the invention comprises a vortex pump 60 for aspirating liquid at the surface into the inside of the duct 12.

The vortex pump 60 is disposed above the second anti-vortex member 40 and at the level of the first series of windows 21.

The vortex pump 60 is driven in rotation by the shaft 14 and comprises, firstly, a circular plate 61 fixed to the shaft 14 and provided on its upper face with radial and vertical vanes 62 and, secondly, a chimney 63 fixed to the upper edge of said vanes 62.

The assembly constituted of the plate 61, the vanes 62, and the chimney 63 is retained to the shaft 14 by means of a sleeve 61a whose vertical position on the shaft 14 is adjustable.

The sleeve 61a is fixed to said shaft 14 by means of a member consisting of a fixing screw, not shown, for example.

As shown in FIGS. 8 and 9, the upper edge of the vanes 62 is equipped with a ring 64 extending toward the exterior of the chimney 63.

The chimney 63 extends toward the top of the vessel 1, substantially from the middle of the first series of windows 21 to the upper edge of the vanes 62.

The chimney 63 forms an internal passage 65 whose lower portion communicates with the interior of the duct 12 via annular passages 66 formed between the vanes 62, the ring 64, and the plate 61.

The chimney 63 is preferably conical with the narrower end facing toward the top of the vessel 1, as shown in FIG. 9.

In a variant, the chimney 63 can be cylindrical.

The vanes 62 are plane or curved and there are preferably three of them, regularly distributed over the plate 61, as shown in FIG. 10.

The rotation of the main screw 13 causes aspiration of the liquid 3 into the duct 12 through the windows 21 and 22 and the liquid 3 flows continuously downward in the duct 12.

Moreover, the rotation of the vortex pump 60 driven by the shaft 14, i.e. the rotation of the assembly constituted of the plate 61, the vanes 62, and the chimney 63, causes aspiration of the liquid 3 at the surface into the passage 65, with the result that the liquid then passes through the annular passages 66 and is reinjected into the vessel 1.

In this embodiment, adjustment of the flowrate of the liquid by the sleeves 25 and 26 inside the duct 12 is not necessary.

Because of the effect of the vortex pump 60, the liquid 3 is subjected to violent agitation, encouraging the incorporation of air into the liquid.

This embodiment is particularly suitable for very foamy products because the foam floating on the surface of the liquid 3 is aspirated by the vortex pump 60, which eliminates the foam quickly and efficiently.

A fifth embodiment of the device according to the invention, shown in FIGS. 11 and 12, comprises a single-passage screw 70 for aspirating the liquid 3 into the interior of the duct 12.

The single-passage screw 70 is disposed above the second anti-vortex member 40 and at the level of the first series of windows 21.

The single-passage screw 70 is driven in rotation by the shaft 14 and comprises, firstly, a circular plate 71 fixed to the shaft 14 and disposed above the level of the liquid 3 in the vessel 1 and, secondly, inside the liquid 3, a vertical plate 72 forming a spiral around the shaft 14 and fixed to the lower face of said plate 71.

As shown more particularly in FIG. 12, the plate 72 delimits a lateral inlet 73 for the liquid extending the whole height of said plate 72, a vertical passage 74 in which the liquid flows downward, and a bottom outlet 75 for said liquid.

The assembly constituted of the plate 71 and the vertical plate 72 is retained to the shaft 14 by means of a sleeve 71a whose vertical position on the shaft 14 can be adjusted.

To this end, the sleeve 71a is fixed to said shaft 14 by means of a member constituted of a fixing screw, not shown, for example.

The internal edge of the vertical plate 72 includes a vertical deflector 76 inclined in the direction of the center of the spiral formed by said plate 72.

The distance between the plate 72 and the axis of the shaft 14 decreases progressively, as shown in FIG. 12.

The rotation of the single-passage screw 70 driven by the shaft 19, i.e. the rotation of the assembly constituted of the plate 71 and the plate 72 in the direction indicated by the arrow in FIG. 12, causes aspiration of the liquid into the interior of said plate 72 via the lateral inlet 73.

The liquid is stirred inside the vertical passage 74, flows downward in the passage 74, and is evacuated into the interior of the duct 12 via the lower outlet 75.

The deflector 76 improves the stirring of the liquid inside the vertical passage 74 and prevents the liquid from returning via the lateral inlet 73.

The stirring effected by the single-passage screw 70 encourages the incorporation of air into the liquid 3.

A sixth embodiment of the device according to the invention, shown in FIGS. 13 and 14, comprises a two-passage screw 80 for aspirating the liquid 3 into the interior of the duct 12.

The two-passage screw 80 is disposed above the second anti-vortex member 40 and at the level of the first series of windows 21.

The two-passage screw 80 is driven in rotation by the shaft 14 and comprises, firstly, a circular plate 81 fixed to the shaft 14 and disposed above the level of the liquid 3 in the vessel 1 and, secondly, two vertical plates 82 and 83 inside the liquid 3.

The vertical plates 82 and 83 are fixed to the lower face of the plate 80 and each takes the form of two half-shells opposite and spaced from each other, as shown in FIG. 14.

The two plates 82 and 83 delimit two lateral inlets 84 and 85 for the liquid, two passages 86 and 87 in which the liquid flows downward, and a lower outlet 88 for said liquid.

The assembly constituted of the plate 81 and the vertical plates 82 and 83 is retained to the shaft 14 by means of a sleeve 81a whose vertical position on the shaft 14 can be adjusted.

The sleeve 81a is fixed to the shaft 14 by means of a member constituted of a fixing screw, not shown, for example.

As shown more particularly in FIG. 14, the edge of each plate 82 and 83 facing the passage 86 or 87 delimited by the other plate includes a respective vertical deflector 89, 90.

The rotation of the two-passage screw 80 driven by the shaft 14, i.e. the rotation of the assembly constituted of the plate 81 and the two vertical plates 82 and 83 in the direction indicated by the arrow in FIG. 14, causes aspiration of the liquid 3 through the windows 21.

The liquid enters via the lateral inlets 84 and 85, is stirred inside the passages 86 and 87, flows downward inside the passages 86 and 87, and is then evacuated into the duct 12 through the lower outlet 88.

The deflectors 89 and 90 augment the stirring of the liquid inside the passages 86 and 87 and prevent the liquid flowing back through the lateral inlets 84 and 85.

The effect of stirring by the two-passage screw 80 encourages incorporation of air into the liquid 3.

In these last two embodiments, adjustment of the flowrate of the liquid by the sleeves 25 and 26 of the duct 12 is not necessary and these last two embodiments are more particularly used in situations where the level of liquid inside the vessel 1 varies.

A pumping screw (not shown) can be disposed on the shaft 14 below the single-passage screw or the two-passage screw to improve the flowrate of the single-passage screw 70 or the two-passage screw 80.

The device according to the invention is applied, for example, to treatment of water, urban effluent, industrial waste water, greases by biological degradation, drainage materials, livestock waste, and generally to all biodegradable industrial products.

Of course, the present invention is not limited to the embodiments described and shown, which are provided by way of illustrative and nonlimiting example.

The invention claimed is:

1. A device for stirring and aerating a liquid in a treatment vessel, comprising:
   at least one funnel adapted to be disposed in the upper portion of said vessel and forming with said vessel a passage,
   at least one duct connected to said funnel and adapted to extend in the direction of the bottom of said vessel, said duct including at least one opening in each of its upper and lower portions,
   at least one main screw situated in said duct,
   a device that drives rotation of said screw, and
   a device that incorporates air into said liquid, wherein:
   said air incorporation device comprises, in addition to the upper edge of said funnel, an annular member inside said funnel in the vicinity of the upper edge of the funnel, so as to incorporate air at atmospheric pressure into said liquid entirely because of the effect of the movement of said liquid.

2. A device according to claim 1, wherein said annular member takes the form of an annular trough.

3. A device according to claim 1, wherein said annular member takes the form of an annular grid.

4. A device according to claim 1, wherein said duct extends above the upper edge of said funnel and said air incorporation device comprises at least one window formed in the upper portion of said duct.

5. A device according to claim 1, wherein said air incorporation device comprises an anti-vortex device disposed inside said duct above said main screw.

6. A device according to claim 1, wherein said air incorporation device comprises an accelerator of the liquid inside said duct.

7. A device according to claim 1, wherein said air incorporation device comprises a device that aerates the surface of said liquid.

8. A device according to claim 1, wherein said air incorporation device comprises a vortex pump inside said duct.

9. A device according to claim 1, wherein said air incorporation device comprises a single-passage screw inside said duct.

10. A device for stirring and aerating a liquid in a treatment vessel, comprising:
- at least one funnel adapted to be disposed in the upper portion of said vessel and forming with said vessel a passage,
- at least one duct connected to said funnel and adapted to extend in the direction of the bottom of said vessel, said duct including at least one opening in each of its upper and lower portions,
- at least one main screw situated in said duct,
- a device that drives rotation of said screw, and
- a device that incorporates air into said liquid, wherein:
- said air incorporation device comprises, in addition to the upper edge of said funnel, an annular member inside said funnel in the vicinity of the upper end of the funnel, so as to incorporate air at atmospheric pressure into said liquid entirely because of the effect of the movement of said liquid.
- wherein said air incorporation device comprises a two-passage screw inside said duct.

11. A device according to claim 1, wherein said main screw is of the mainly axial flow type.

12. A device according to claim 1, further comprising an anti-vortex device disposed inside said duct below said main screw.

13. A device according to claim 1, further comprising a dynamic stirring device.

14. A device according to claim 1, further comprising a static stirring device that creates turbulence disposed inside said duct.

15. A device according to claim 1, further comprising a device that aspirates foam formed on the surface of said liquid into the interior of said duct.

16. A device according to claim 1, further comprising a device that injects compressed air into said duct.

17. A liquid treatment vessel comprising a device according to claim 1.

18. A device according to claim 1, wherein said air incorporation device comprises a two-passage screw inside said duct.

* * * * *